(12) United States Patent
Jiko et al.

(10) Patent No.: US 12,452,470 B2
(45) Date of Patent: Oct. 21, 2025

(54) IMAGE DISTRIBUTION APPARATUS, DISPLAY APPARATUS, IMAGE CAPTURE APPARATUS, AND CONTROL METHOD

(71) Applicant: CANON KABUSHIKI KAISHA, Tokyo (JP)

(72) Inventors: Takuma Jiko, Kanagawa (JP); Koichi Okada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 18/485,968

(22) Filed: Oct. 12, 2023

(65) Prior Publication Data
US 2024/0064351 A1    Feb. 22, 2024

Related U.S. Application Data

(63) Continuation of application No. PCT/JP2022/014365, filed on Mar. 25, 2022.

(30) Foreign Application Priority Data

Apr. 14, 2021   (JP) .............................. 2021-068531
Jan. 25, 2022   (JP) .............................. 2022-009525

(51) Int. Cl.
    *H04N 21/239*    (2011.01)
    *H04N 13/194*    (2018.01)
    (Continued)

(52) U.S. Cl.
    CPC ......... *H04N 21/239* (2013.01); *H04N 13/194* (2018.05); *H04N 13/282* (2018.05);
    (Continued)

(58) Field of Classification Search
    CPC .. H04N 21/239; H04N 13/296; H04N 13/194; H04N 13/282; H04N 23/661;
    (Continued)

(56) References Cited

U.S. PATENT DOCUMENTS 11,632,531 B1 *   4/2023   Bryan ................ H04N 21/4307
                                                                       348/43
2023/0037102 A1 *  2/2023   Homma .................. G06F 13/00

FOREIGN PATENT DOCUMENTS

EP        3618429 B1 *   9/2023   ............... G09G 5/14
JP        2006067405 A     3/2006
(Continued)

*Primary Examiner* — Nnenna N Ekpo
(74) *Attorney, Agent, or Firm* — Canon U.S.A., Inc. IP Division

(57) ABSTRACT

An image distribution apparatus obtains a plurality of images generated by a plurality of image capture apparatuses capturing images of a predetermined subject from different directions, transmits the plurality of images to the plurality of display apparatuses, receives, from the plurality of display apparatuses, viewed image information regarding an image being displayed/reproduced in the plurality of display apparatuses, calculates a degree of attention for each of the image capture apparatuses capturing the images, based on the viewed image information, and transmits, to each of the image capture apparatuses, notification control information for causing a notification unit of the image capture apparatus, the notification unit being disposed in the same orientation as a lens unit of the image capture apparatus, to give notification based on the degree of attention.

15 Claims, 12 Drawing Sheets

(51) Int. Cl.
    *H04N 13/282*     (2018.01)
    *H04N 13/296*     (2018.01)
    *H04N 21/2187*     (2011.01)
    *H04N 21/258*     (2011.01)
    *H04N 21/6332*     (2011.01)
    *H04N 21/81*     (2011.01)
    *H04N 23/661*     (2023.01)
    *H04N 23/95*     (2023.01)

(52) U.S. Cl.
    CPC ....... *H04N 13/296* (2018.05); *H04N 21/2187* (2013.01); *H04N 21/25866* (2013.01); *H04N 21/6332* (2013.01); *H04N 21/816* (2013.01); *H04N 23/661* (2023.01); *H04N 23/95* (2023.01)

(58) Field of Classification Search
    CPC ............... H04N 23/95; H04N 21/2187; H04N 21/25866; H04N 21/6332; H04N 21/816
    See application file for complete search history.

(56) References Cited

FOREIGN PATENT DOCUMENTS

| | | |
|---|---|---|
| JP | 2013162501 A | 8/2013 |
| JP | 2019220994 A | 12/2019 |

* cited by examiner

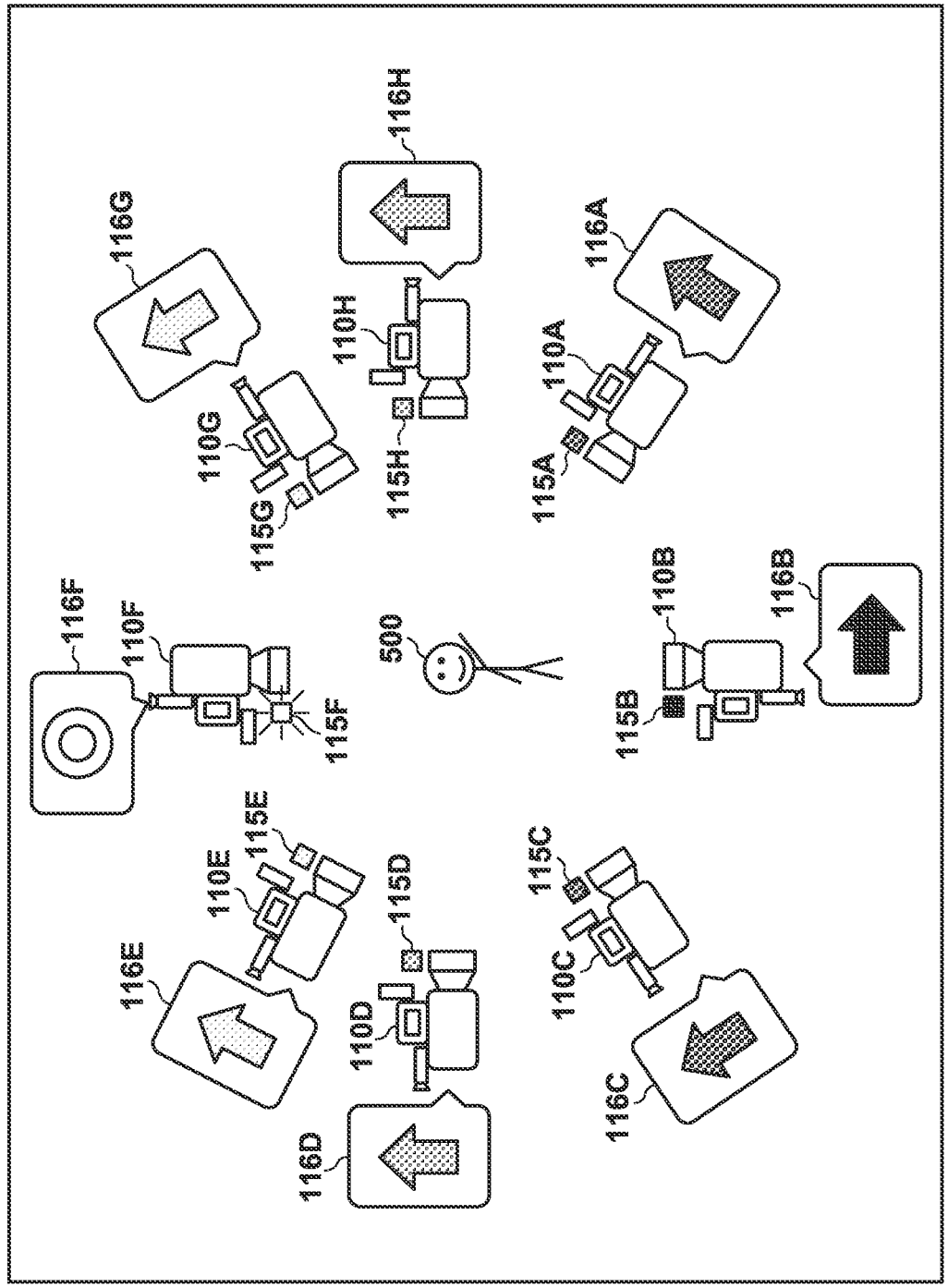

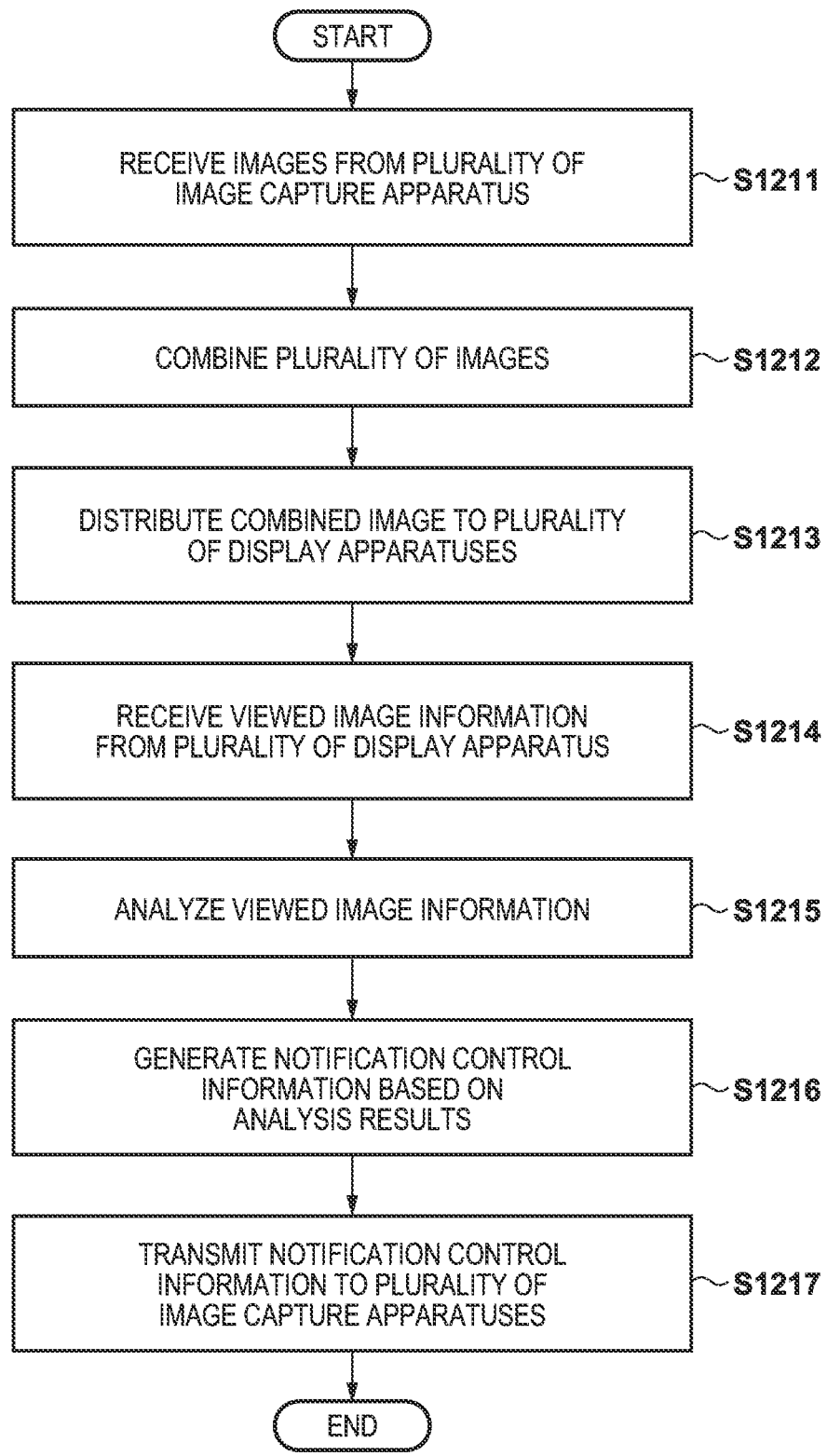

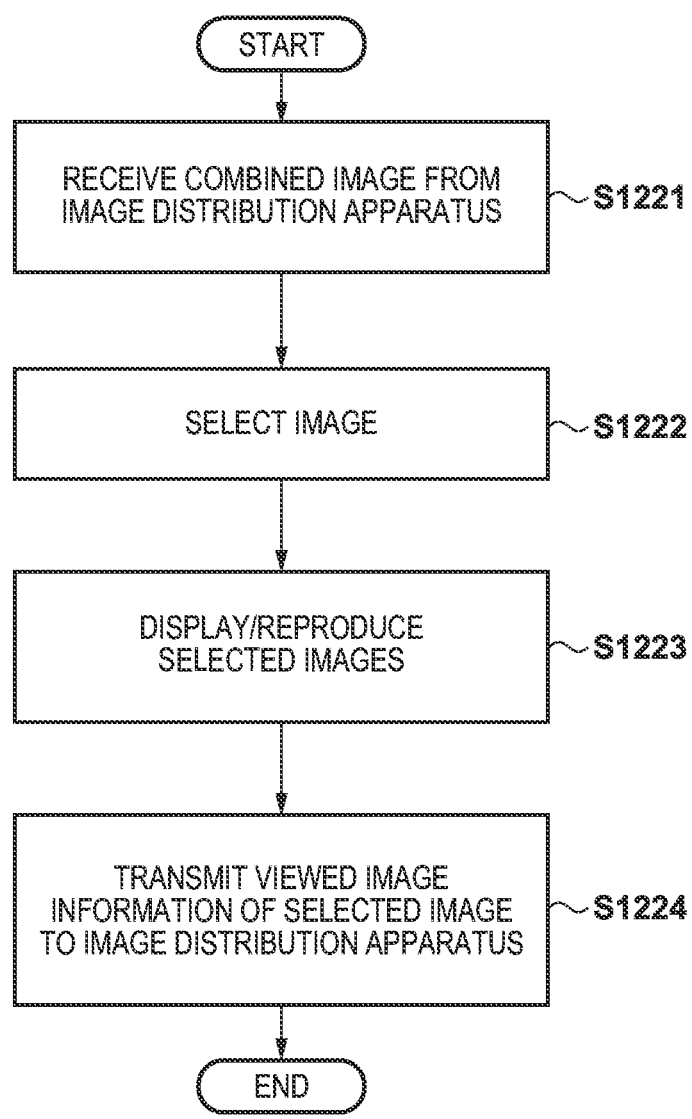

IMAGE DISTRIBUTION APPARATUS, DISPLAY APPARATUS, IMAGE CAPTURE APPARATUS, AND CONTROL METHOD

CROSS-REFERENCE TO RELATED APPLICATIONS

This application is a Continuation of International Patent Application No. PCT/JP2022/014365, filed Mar. 25, 2022, which claims the benefit of Japanese Patent Application Nos. 2021-068531, filed Apr. 14, 2021 and 2022-009525, filed Jan. 25, 2022, all of which are hereby incorporated by reference herein in their entirety.

BACKGROUND OF THE INVENTION

Field of the Invention

The present invention relates to a system for displaying/reproducing, on a plurality of display apparatuses, a plurality of images of a subject captured from different directions by a plurality of image capture apparatuses.

Background Art

Volumetric capture technology, for example, is known that is for generating 3D spatial data using images captured by a plurality of image capture apparatuses (hereinafter referred to as "cameras") and generating an image captured from a desired viewpoint (free-viewpoint image) by virtually moving a camera in a 3D space. The image generated by these technologies has a huge data volume, and there has, therefore, been a problem in that data processing and data transmission take time when the image is distributed in real time. However, this problem is expected to be solved with the widespread of 5G in the future. PTL 1 describes a technology for generating an image of a virtual participant called an avatar in a viewer participation-type program in order to provide a viewer with an atmosphere in which the viewer is participating in the program, and generating an image captured from a viewpoint corresponding to the position of the avatar.

When a plurality of cameras are capturing images of a performer from different directions at an image-capturing location, the performer is notified of the camera that is capturing an on-air image. PTL 2 describes a technology for notifying a subject of a camera that is capturing an on-air image by operating a controller to control turning on and off of a tally lamp.

CITATION LIST

Patent Literature

PTL1: Japanese Patent Laid-Open No. 2006-067405
PTL2: Japanese Patent Laid-Open No. 2013-162501

With PTL 1, the viewer can view the image from the desired viewpoint, but the subject cannot easily understand which camera to gaze at. In regard to this problem, according to PTL 2, conventionally, the on-air image is uniquely determined by a distributor, and the subject can thus identify the camera that is capturing the on-air image, based on the tally lamp. However, when it is assumed that a free-viewpoint image is distributed using the aforementioned volumetric capture technology or the like, a plurality of viewers can view images of the subject from respective desired viewpoints, which may make it difficult for the subject to identify the camera that the subject is to gaze at with the technology of PTL 2.

SUMMARY OF THE INVENTION

The present invention has been made in view of the foregoing problem, and realizes a technology with which, when a plurality of display apparatuses are displaying/reproducing a plurality of images of a subject captured from different directions by a plurality of image capture apparatuses, the image capture apparatuses that are capturing the images are given notification corresponding to the degree of attention based on the view status of respective images.

In order to solve the aforementioned problems, the present invention provides an image distribution apparatus comprising: a processor; and a memory storing instructions which, when executed by the processor, configure the processor of the image distribution apparatus to: obtain a plurality of images generated by a plurality of image capture apparatuses capturing images of a predetermined subject from different directions; transmit the plurality of images to the plurality of display apparatuses; receive, from the plurality of display apparatuses, viewed image information regarding an image being displayed/reproduced in the plurality of display apparatuses; calculate a degree of attention for each of the image capture apparatuses capturing the images, based on the viewed image information; and transmit, to each of the image capture apparatuses, notification control information for causing a notification unit of the image capture apparatus, the notification unit being disposed in the same orientation as a lens unit of the image capture apparatus, to give notification based on the degree of attention.

In order to solve the aforementioned problems, the present invention provides a display apparatus that displays an image on a screen comprising: a processor; and a memory storing instructions which, when executed by the processor, configure the processor of the display apparatus to: receive, from an image distribution apparatus, a plurality of images generated by a plurality of image capture apparatuses capturing images of a predetermined subject from different directions; accept an operation performed by a viewer and select an image out of the plurality of images; generate display image data based on the selected image; display/reproduce the display image data; and transmit viewed image information regarding the selected image, to the image distribution apparatus.

In order to solve the aforementioned problems, the present invention provides an image capture apparatus comprising: a processor; and a memory storing instructions which, when executed by the processor, configure the processor of the display apparatus to: generate an image by capturing an image of a predetermined subject from a direction different from a direction from which another image capture apparatus captures an image of the predetermined subject; transmit the generated image to an image distribution apparatus, wherein the generated image is further transferred from the image distribution apparatus to a display apparatus; receive, from the image distribution apparatus, notification control information for executing notification processing based on a degree of attention, which is calculated based on viewed image information regarding an image being displayed/reproduced in the display apparatus; and execute the notification processing based on the notification control information.

In order to solve the aforementioned problems, the present invention provides a method of controlling an image distribution apparatus that distributes an image to a plurality of display apparatuses, the method comprising: obtaining a plurality of images generated by a plurality of image capture apparatuses capturing images of a predetermined subject from different directions; transmitting the plurality of images to the plurality of display apparatuses; receiving, from the display apparatuses, viewed image information regarding an image being displayed/reproduced in the display apparatuses; calculating a degree of attention for each of the plurality of image capture apparatuses capturing the images, based on the viewed image information; and transmitting, to each of the image capture apparatuses, notification control information for causing a notification unit of the image capture apparatus, the notification unit being disposed in the same orientation as a lens unit of the image capture apparatus, to give notification based on the degree of attention.

In order to solve the aforementioned problems, the present invention provides a method of controlling a display apparatus that displays an image on a screen, the method by comprising: receiving, from an image distribution apparatus, a plurality of images generated by a plurality of image capture apparatuses capturing images of a predetermined subject from different directions; accepting an operation performed by a viewer and selecting an image out of the plurality of images; generating display image data based on the selected image; displaying/reproducing the display image data; and transmitting viewed image information regarding the selected image to the image distribution apparatus.

In order to solve the aforementioned problems, the present invention provides a method of controlling an image capture apparatus, the method comprising: generating an image by capturing an image of a predetermined subject from a direction different from a direction from which another image capture apparatus captures an image of the predetermined subject; transmitting the image to an image distribution apparatus, wherein the image is further transferred from the image distribution apparatus to a display apparatus; receiving, from the image distribution apparatus, notification control information for executing notification processing based on a degree of attention, which is calculated based on viewed image information regarding an image being displayed/reproduced in the display apparatus; and executing the notification processing based on the notification control information.

In order to solve the aforementioned problems, the present invention provides a non-transitory computer-readable storage medium storing a program for causing a computer to execute a method of controlling an image distribution apparatus that distributes an image to a plurality of display apparatuses, the method comprising: obtaining a plurality of images generated by a plurality of image capture apparatuses capturing images of a predetermined subject from different directions; transmitting the plurality of images to the plurality of display apparatuses; receiving, from the display apparatuses, viewed image information regarding an image being displayed/reproduced in the display apparatuses; calculating a degree of attention for each of the plurality of image capture apparatuses capturing the images, based on the viewed image information; and transmitting, to each of the image capture apparatuses, notification control information for causing a notification unit of the image capture apparatus, the notification unit being disposed in the same orientation as a lens unit of the image capture apparatus, to give notification based on the degree of attention.

In order to solve the aforementioned problems, the present invention provides a non-transitory computer-readable storage medium storing a program for causing a computer to execute a method of controlling a display apparatus that displays an image on a screen, the method by comprising: receiving, from an image distribution apparatus, a plurality of images generated by a plurality of image capture apparatuses capturing images of a predetermined subject from different directions; accepting an operation performed by a viewer and selecting an image out of the plurality of images; generating display image data based on the selected image; displaying/reproducing the display image data; and transmitting viewed image information regarding the selected image to the image distribution apparatus.

In order to solve the aforementioned problems, the present invention provides a non-transitory computer-readable storage medium storing a program for causing a computer to execute a method of controlling an image capture apparatus, the method comprising; generating an image by capturing an image of a predetermined subject from a direction different from a direction from which another image capture apparatus captures an image of the predetermined subject; transmitting the image to an image distribution apparatus, wherein the image is further transferred from the image distribution apparatus to a display apparatus; receiving, from the image distribution apparatus, notification control information for executing notification processing based on a degree of attention, which is calculated based on viewed image information regarding an image being displayed/reproduced in the display apparatus; and executing the notification processing based on the notification control information.

Further features of the present invention will become apparent from the following description of exemplary embodiments with reference to the attached drawings.

BRIEF DESCRIPTION OF THE DRAWINGS

FIG. 11 illustrates a method of associating notification operations performed by a plurality of image capture apparatuses with each other according to Embodiment 1.

FIG. 12B is a flowchart illustrating an example of an operation performed by an image distribution apparatus according to Embodiment 1.

FIG. 12C is a flowchart illustrating an example of an operation performed by a display apparatus according to Embodiment 1.

DESCRIPTION OF THE EMBODIMENTS

Figure 1:
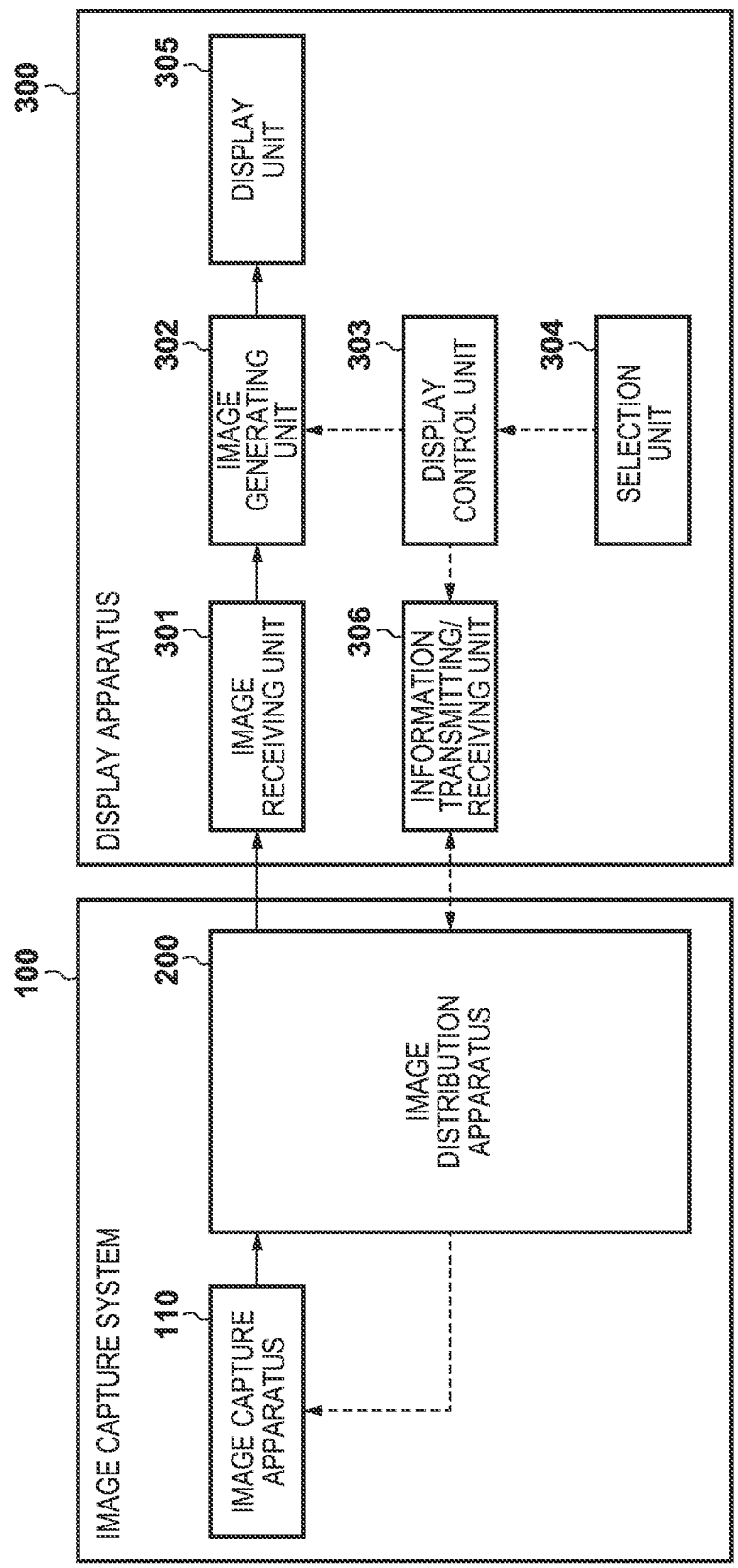
FIG. 1 shows a configuration of a system that distributes images according to Embodiment 1.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

Embodiment 1

Firstly, Embodiment 1 will be described.

The following describes an embodiment in which the present invention is applied to a system in which a subject is given notification that enables the subject to identify an image capture apparatus that the subject is to gaze at, based on the view status of images captured by a plurality of image capture apparatuses and distributed to a plurality of display apparatuses.

System Configuration

First, a system configuration of Embodiment 1 will be described with reference to FIGS. 1 and 2. FIG. 1 shows an example of a configuration of a system that distributes an image according to Embodiment 1.

The system of the present embodiment includes an image capture system 100 that distributes images captured by a plurality of image capture apparatuses 110, and a display apparatus 300 that displays the images distributed by the image capture system 100 such that a viewer can view the images.

The image capture system 100 has a plurality of image capture apparatuses 110 and an image distribution apparatus 200. The image capture system 100 distributes images generated by the image capture apparatuses 110 to the display apparatus 300 of the viewer using the image distribution apparatus 200, obtains viewed image information regarding an image that is being viewed on the display apparatus 300, and controls each component. Each image capture apparatus 110 is a digital camera that captures and generates an image of a subject and outputs the generated image to an external apparatus.

The display apparatus 300 has an image receiving unit 301, an image generating unit 302, a display control unit 303, a selection unit 304, a display unit 305, and an information transmitting/receiving unit 306. The display apparatus 300 selects a desired image out of the images distributed from the image capture system 100, displays/reproduces the selected image, and transmits viewed image information regarding the selected desired image to the image capture system 100. The image receiving unit 301 is a communication interface capable of receiving images using a predetermined communication method. The image generating unit 302 is an image processor that generates a plurality of images using a combined image. The display control unit 303 is a controller with an arithmetic processor for controlling operation of the entire display apparatus, a ROM, a RAM, or the like. The selection unit 304 is an operation unit that is a pushbutton switch, a rotary dial, a touch screen, or the like for accepting a user operation. The display unit 305 is a display device such as a liquid-crystal panel or an organic EL panel. The information transmitting/receiving unit 306 is a communication interface capable of transmitting and receiving data using a predetermined communication method.

Figure 2:
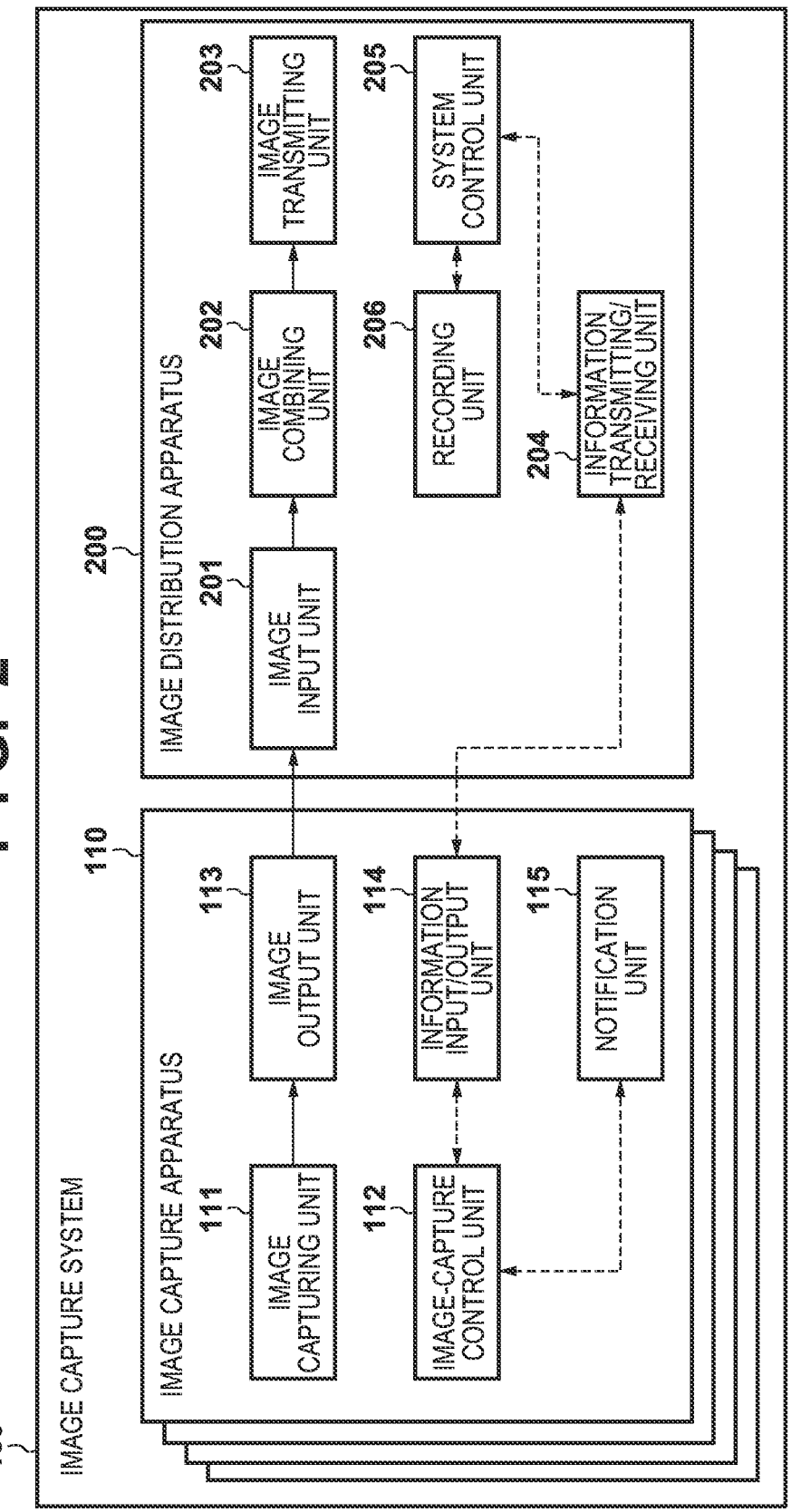
FIG. 2 shows an example of a configuration of an image capture system according to Embodiment 1.
Figure 12A:
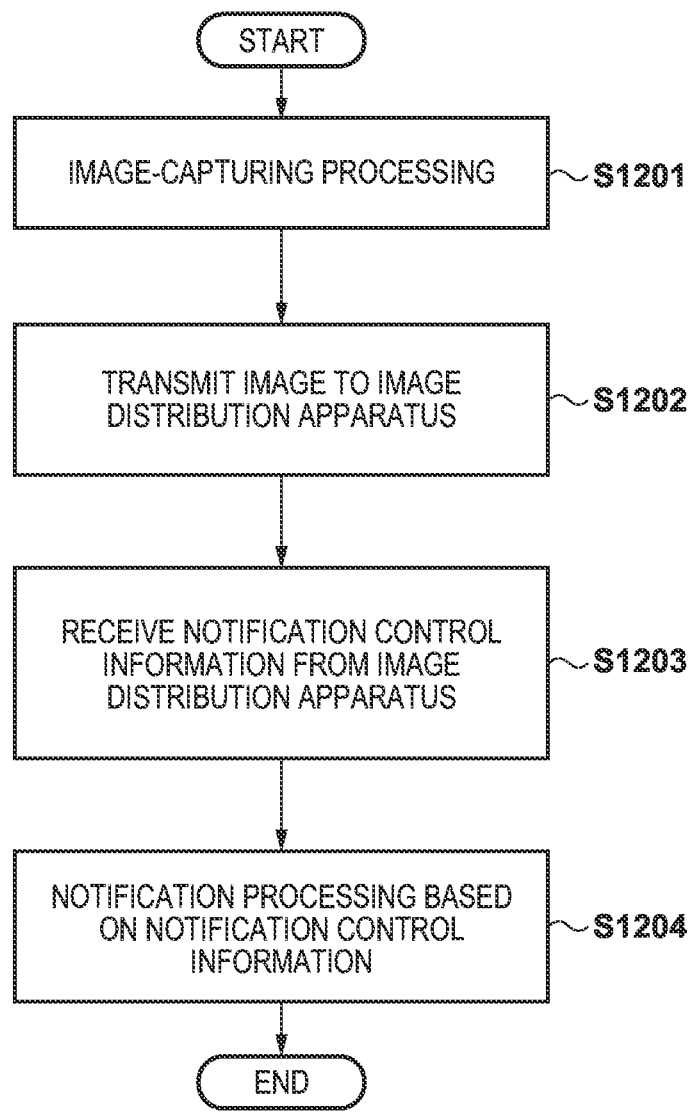
FIG. 12A is a flowchart illustrating an example of an operation performed by the image capture apparatus according to Embodiment 1.

FIG. 2 shows an example of a configuration of the image capture system 100 in FIG. 1. The image capture system 100 includes a plurality of image capture apparatuses 110 and an image distribution apparatus 200. FIG. 12A is a flowchart illustrating an example of operation performed by each image capture apparatus 110.

Each image capture apparatus 110 has an image capturing unit 111, an image-capturing control unit 112, an image output unit 113, an information input/output unit 114, and a notification unit 115. The image capturing unit 111 is an image sensor that includes photoelectric conversion elements, such as a CCD or a CMOS. The image-capturing control unit 112 is a controller with an arithmetic processor for controlling an image-capturing operation of the image capturing unit 111, a ROM, a RAM, or the like. The image output unit 113 is an output interface capable of transferring images. The information input/output unit 114 is an input/output interface capable of transmitting and receiving data. The notification unit 115 is a tally lamp that includes a light-emitting element such as an LED that is visible to a subject, and has a function of giving a notification by emitting light. The notification unit 115 need only be located at a position that is visible to the subject an image of which is captured through a lens unit included in the image capture apparatus 110. That is, the notification unit 115 is oriented in the image-capturing direction, similarly to the lens unit.

The image capture apparatus 110 converts an optical image of a subject that is formed by an optical system into an electrical signal and generates an image, using the image capturing unit 111 and the image-capturing control unit 112 (S1201). The image is subjected to various types of image processing, and metadata and audio data are added to the processed image, and the data is converted into a file or streaming data. The image capture apparatus 110 transmits the image to the image distribution apparatus 200 using the image output unit 113 (S1202).

The image distribution apparatus 200 has an image input unit 201, an image combining unit 202, an image transmitting unit 203, an information transmitting/receiving unit 204, a system control unit 205, and a recording unit 206. The image distribution apparatus 200 performs predetermined image processing on images obtained from the plurality of image capture apparatuses 110 and distributes the processed images to the display apparatus 300 of the viewer. The image input unit 201 is an input interface capable of receiving images. The image combining unit 202 is an image processor that combines a plurality of images. The image transmitting unit 203 is a communication interface capable of distributing images using a predetermined communication method. The information transmitting/receiving unit 204 is a communication interface capable of transmitting and receiving data using a predetermined communication method. The system control unit 205 is a controller with an arithmetic processor for controlling operation of the entire system, a ROM, a RAM, or the like. The recording unit 206 is a storage device such as a flash memory or a hard disk.

Next, functions of the components of the image capture system 100 and the display apparatus 300 will be described with reference to FIG. 2. FIG. 12B is a flowchart illustrating an example of operation performed by the image distribution apparatus 200. FIG. 12C is a flowchart illustrating an example of operation performed by the display apparatus 300.

In the image distribution apparatus 200, the image input unit 201 receives image data generated by the plurality of image capture apparatuses 110 (S1211), and the image combining unit 202 generates combined image data by combining the plurality of images (S1212). The combined image data is multi-stream data in which a plurality of images are integrated, image data obtained by performing stitching processing on data of a plurality of images, or 3D spatial data generated using data of a plurality of images. The combined image data need only be data of a plurality of images associated with each other into one set, and may be but need not be integrated into one file or one piece of stream data. The combined image data generated by the image combining unit 202 is distributed to a plurality of display apparatuses 300 from the image transmitting unit 203 over a communication line, such as 4G, 5G, or the Internet, or broadcast radio waves (S1213), and is displayed/reproduced in the display apparatuses 300 of a plurality of viewers, thus enabling the viewers to view each image.

In the display apparatus 300, the image receiving unit 301 receives the combined image data distributed from the image distribution apparatus 200 (S1221). The display control unit 303 causes the selection unit 304 to select one of the plurality of images included in the combined image data, using a later-described selection method (S1222). An example of the selection method will be described later with reference to FIGS. 4 to 9. The combined image data is output to the image generating unit 302, and the image generating unit 302, based on the data indicating the selected image, decodes the combined image data, performs image superimposition processing to generate display image data, and outputs the generated display image data to the display unit 305, in accordance with control performed by the display control unit 303. For example, the image generating unit 302 generates display image data to be displayed in full screen for only the selected image out of the plurality of images included in the combined image data. Alternatively, the image generating unit 302 generates display image data such that the selected image is disposed in the center of the screen and unselected images are disposed in a smaller area than the selected image and at an end portion of the screen. The display unit 305 displays/reproduces the display image data generated by the image generating unit 302 (S1223).

Next, a method of transmitting the viewed image information from the display apparatus 300 to the image distribution apparatus 200 will be described.

In the display apparatus 300, the selection unit 304 can select an image to be viewed out of a plurality of images received by the display apparatus 300, and can also execute various actions on the selected image. Various actions may include, for example, instructions to execute rating, payment, support, or the like for the selected image that is being displayed/reproduced. The viewed image information, which contains identification information that specifies the image selected by the selection unit 304 and the contents of the action, is output to the display control unit 303. The display control unit 303 controls processing performed by the image generating unit 302 in accordance with the data selected by the selection unit 304 and causes the information transmitting/receiving unit 306 to transmit the viewed image information regarding the image selected by the selection unit 304 to the image distribution apparatus 200 (S1224).

In the image distribution apparatus 200, the information transmitting/receiving unit 204 receives the viewed image information transmitted from a plurality of display apparatus 300 (S1214) and outputs the received information to the system control unit 205. The system control unit 205 analyzes the viewed image information and updates analysis results recorded in the recording unit 206 (S1215). The analysis results include information representing a degree of attention of each image that is calculated from the number of times each of the images generated by the plurality of image capture apparatuses 110 has been viewed (the number of times of images selected in each display apparatus) and the action executed on the image. That is, information representing the degree of attention is generated for each image capture apparatus 110 in accordance with the analysis results. The analysis results may be updated at every predetermined time, when the change amount of a parameter included in the viewed image information exceeds a predetermined threshold, or in response to a request made by the user at a desired timing.

If the analysis results recorded in the recording unit 206 are updated, the system control unit 205 generates notification control information for the plurality of image capture apparatuses 110 based on the analysis results (S1216) and outputs the generated information to the image capture apparatuses 110 (S1217). The notification control information is received by the information transmitting/receiving unit 204 of the image distribution apparatus 200, transmitted to the information input/output unit 114 of each of the image capture apparatuses 110, and received by the image-capturing control unit 112 of the image capture apparatus 110 (S1203). The image-capturing control unit 112 controls the notification unit 115 to perform notification processing based on the notification control information (S1204). An example of the notification processing will be described later with reference to FIGS. 10 and 11. The notification control information may be generated by the system control unit 205 for the plurality of image capture apparatuses 110 and transmitted to each of the image capture apparatuses 110. Further, the system control unit 205 may generate notification control information that can be commonly recognized by the plurality of image capture apparatuses 110 and transmit the generated information to each of the image capture apparatuses 110, and each image capture apparatus 110 may separately analyze the notification control information and control execution of the notification processing based on the analysis results.

Next, a method of generating the combined image data in the image distribution apparatus 200 in the image capture system 100 and a method of selecting an image and a method of transmitting viewed image information in the display apparatus 300, will be described with reference to FIGS. 3 to 9.

Figure 3:
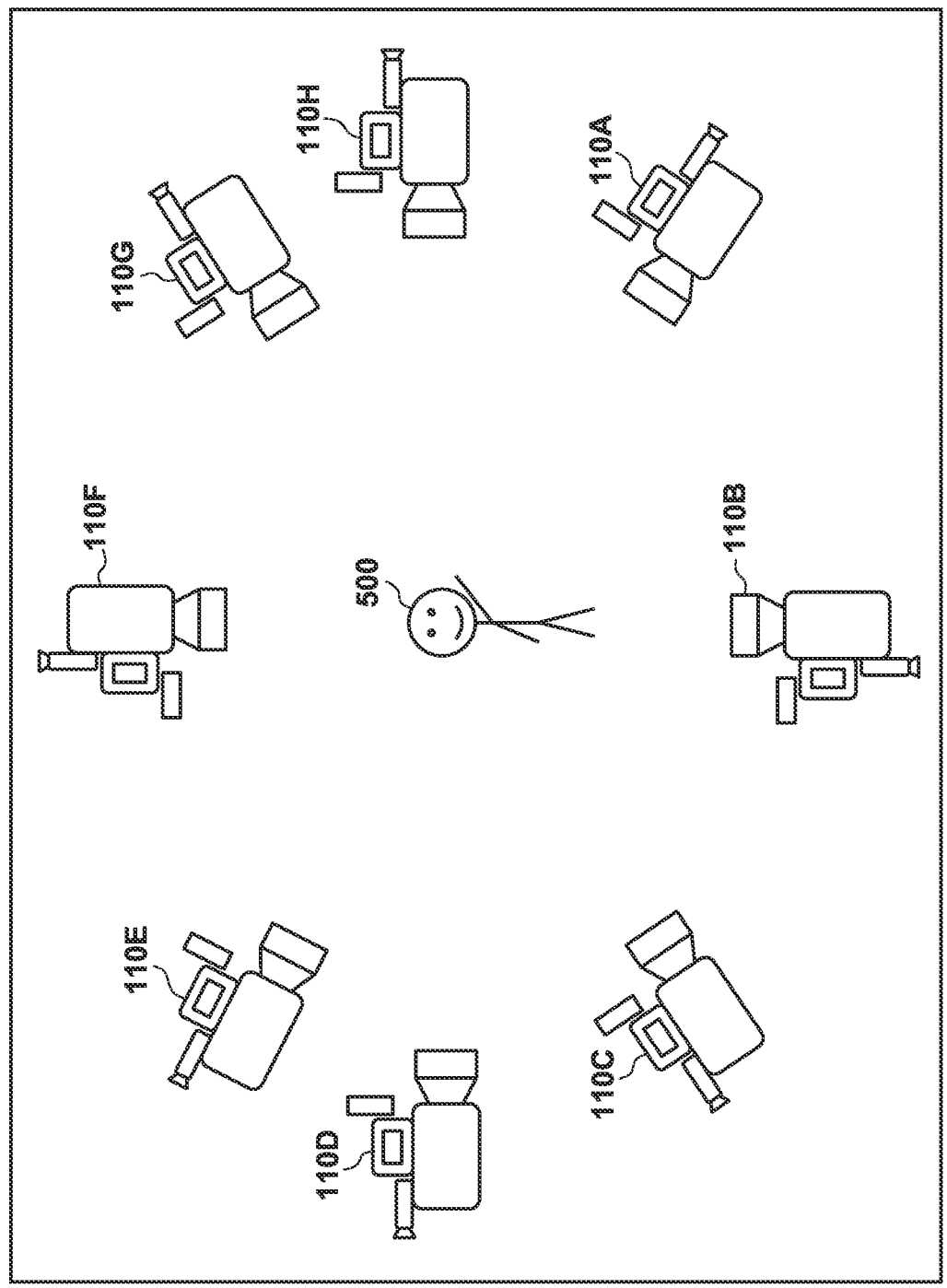
FIG. 3 illustrates an image-capturing environment according to Embodiment 1.

FIG. 3 shows an example of an image-capturing environment of the image capture system 100 according to the present embodiment. In the example in FIG. 3, the plurality of image capture apparatuses 110A to 110H are arranged surrounding a subject 500 and capture images of the subject 500 from different directions. A plurality of images 600A to 600H captured by the plurality of image capture apparatuses 110A to 110H are transmitted to the image distribution apparatus 200, combined by the image combining unit 202, and distributed as combined image data to a plurality of display apparatuses 300.

The following describes examples of image selection methods in the respective cases where the combined image data is multi-stream data, stitched image data, and 3D spatial data. FIG. 3 shows an example in which eight image capture apparatuses 110A to 110H capture images of the subject 500; however, in order to simplify the explanation, the following description uses an example of first to third images 600A to 600C captured by three, namely the first to third image capture apparatuses 110A to 110C, respectively.

First, an image selection method in the case where the combined image data is multi-stream data will be described with reference to FIGS. 4 and 5.

Figure 4:
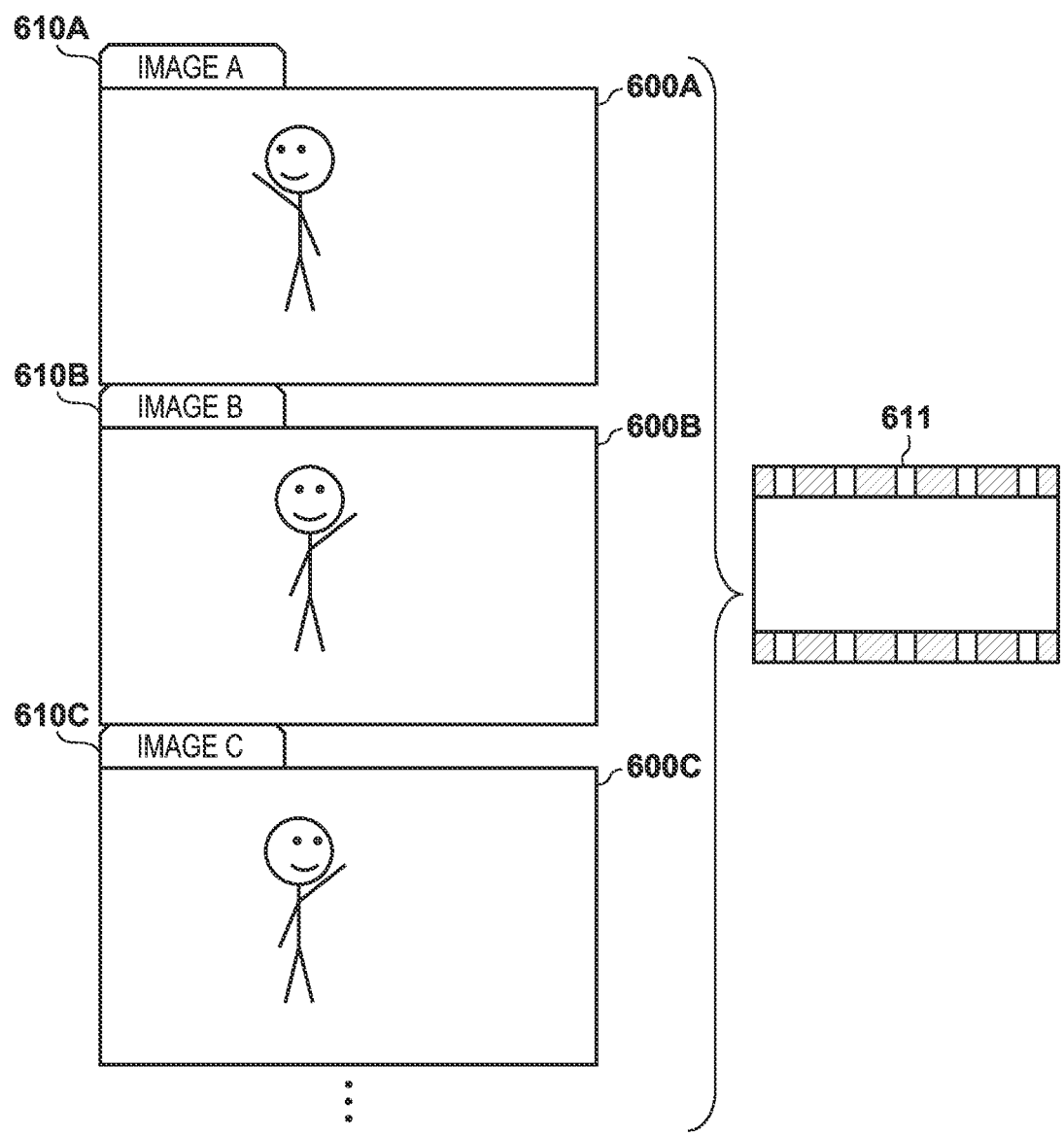
FIG. 4 shows an example of multi-stream data according to Embodiment 1.
Figure 5:
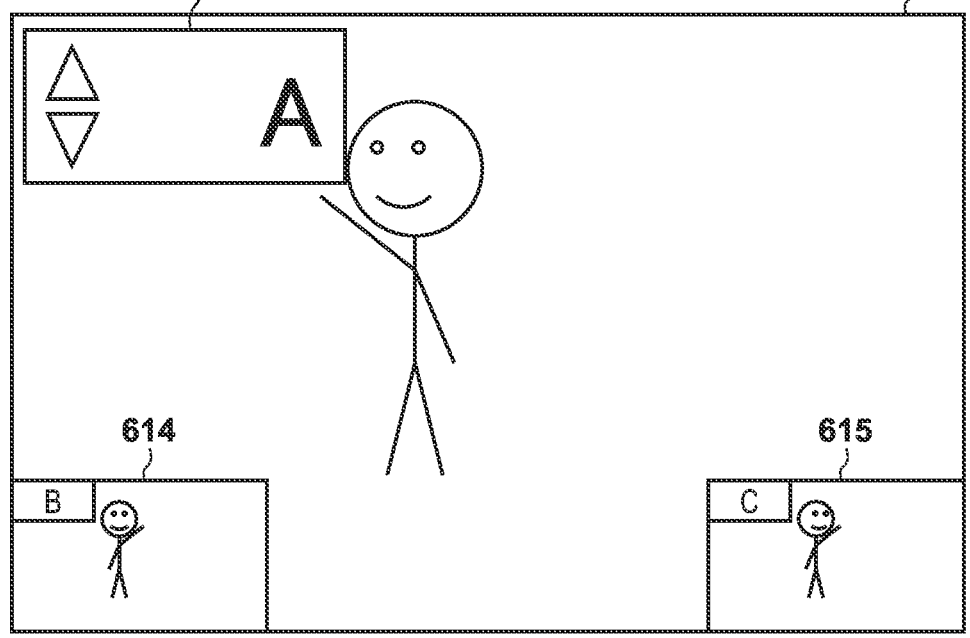
FIG. 5 shows an example of an image selection screen according to Embodiment 1.

FIG. 4 shows an example of multi-stream data generated by the image combining unit 202. In FIG. 4, images A to C correspond to the first to third images 600A to 600C captured by the first to third image capture apparatuses 110A to 110C. First to third metadata 610A to 610C, each of which includes identification information for identifying the corresponding one of the first to third image capture apparatuses 110A to 110H that captured the images 600A to 600C, are added to the first to third images 600A to 600C. The image combining unit 202 encodes the image data and the first to third metadata of the input first to third images 600A to 600C to generate a single multi-stream data 611, and the image transmitting unit 203 distributes the multi-stream data to the display apparatus 300.

In the display apparatus 300, the image generating unit 302 decodes multi-stream data 611, generates image data corresponding to the first to third images 600A to 600C, and displays the generated image data in the display unit 305. The selection unit 304 is capable of accepting a user operation to select an image to be displayed in full screen in the display unit 305 out of the first to third images 600A to 600C. When the selection unit 304 accepts an instruction to select an image, an image selection screen 612 is displayed in the display unit 305, as shown in FIG. 5. The image selection screen 612 displays an image selection sub-screen 613, a previous image display sub-screen 614, and a next image display sub-screen 615. The image selection sub-screen 613 displays identification information regarding the first to third metadata 610A to 610C included in the multi-stream data 611, and the user can select an image with a desired piece of identification information image by operating the selection unit 304. The previous image display sub-screen 614 displays a piece of identification information and an image that precede in the sequence the piece of identification information selected in the image selection sub-screen 613. The next image display sub-screen 615 displays a piece of identification information and an image that follow in the sequence the piece of identification information selected in the image selection sub-screen 613. If the user changes the piece of identification information selected in the image selection sub-screen 613 by operating the selection unit 304, the display unit 305 displays an image corresponding to the piece of identification information selected in the image selection sub-screen 613 (first image 600A in the example in FIG. 5) and updates the pieces of identification information and the images displayed in the previous image display sub-screen 614 and the next image display sub-screen 615. Then, if the user finally determines a piece of identification information by operating the selection unit 304, the image selection sub-screen 613, the previous image display sub-screen 614, and the next image display sub-screen 615 are hidden, and the image corresponding to the finally determined piece of identification information is displayed in full screen. Further, the information transmitting/receiving unit 306 transmits, as the viewed image information, the finally determined piece of identification information to the image distribution apparatus 200 in the image capture system 100. In the image distribution apparatus 200, the system control unit 205 counts the number of views (or the number of viewers) for the image capture apparatus 110 that captured the image corresponding to the piece of identification information received from the display apparatus 300, and the count value is recorded in the recording unit 206.

Next, an image selection method in the case where the combined image data is stitched image data will be described with reference to FIGS. 6 and 7.

Figure 6:
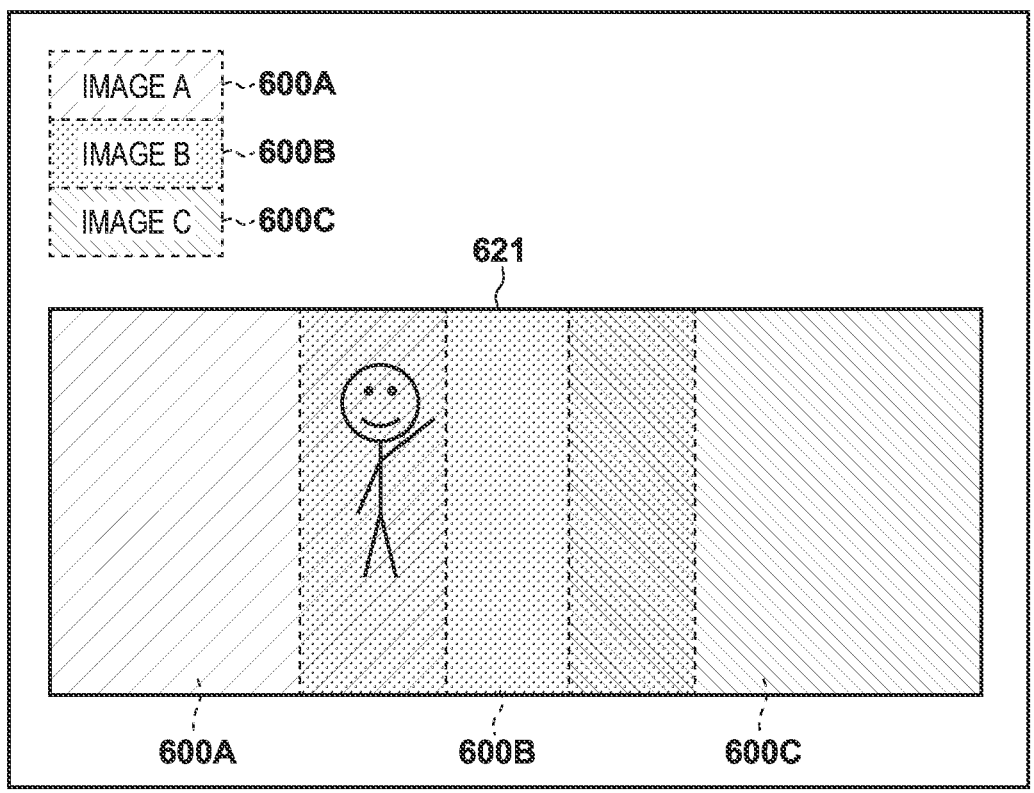
FIG. 6 shows an example of a stitched image according to Embodiment 1.
Figure 7:
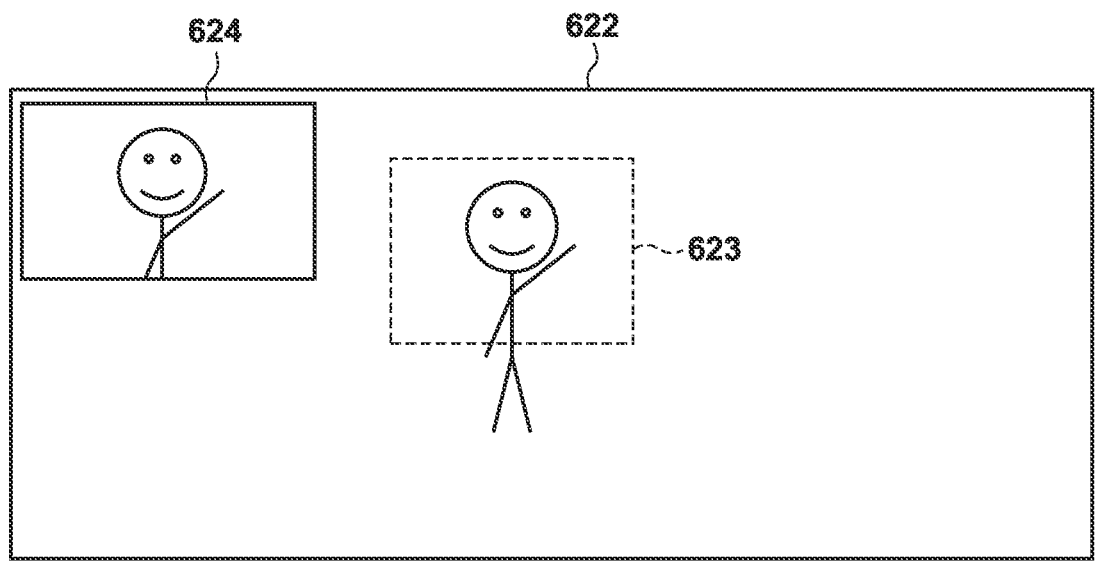
FIG. 7 illustrates a method of selecting a stitched image according to Embodiment 1.

FIG. 6 shows an example of a stitched image generated by the image combining unit 202. In FIG. 6, images A to C are the first to third images 600A to 600C captured by the first to third image capture apparatuses 110A to 110C, respectively. A stitched image 621 is a combined image generated by performing stitching processing on the first to third images 600A to 600C. Stitching processing refers to processing to transform, move, and combine a plurality of images and generate one combined image. The image combining unit 202 generates one stitched image 621 by performing stitching processing on image data of the input first to third images 600A to 600C. The image transmitting unit 203 distributes stitched image data obtained by encoding the stitched image 621 to the display apparatus 300.

In the display apparatus 300, the image generating unit 302 decodes the stitched image data and generates image data corresponding to the stitched image 621, and the display unit 305 displays the generated image. The selection unit 304 is capable of accepting a user operation to select a specific image region from the stitched image 621. When the selection unit 304 accepts an instruction to select an image, an image selection screen 622 is displayed in the display unit 305, as shown in FIG. 7. The image selection screen 622 displays a region selection indicator 623 and a display check screen 624 that are superimposed on the stitched image 621. The user can perform, with the selection unit 304, an operation to, for example, move, enlarge, reduce, and rotate the region selection indicator 623 and select a desired region as an image region to be viewed from the stitched image 621. The image region selected by the region selection indicator 623 is displayed in the display check screen 624, and the user can check the image region to be viewed by looking at the image displayed in the display check screen 624. If the user finally determines the image region to be viewed by operating the selection unit 304, the image selection screen 622 is hidden and the image of the finally determined image region is displayed in full screen. Further, the information transmitting/receiving unit 306 transmits, as the viewed image information, the finally determined image region to the image distribution apparatus 200 in the image capture system 100. In the image distribution apparatus 200, the system control unit 205 counts the number of views for the image capture apparatus 110 that captured the image of the image region received from the display apparatus 300, and the count value is recorded in the recording unit 206. In this case, the count value of the number of views may be weighted in accordance with the proportion of the area occupied by the image region.

Next, an image selection method in the case where the combined image data is 3D spatial data will be described with reference to FIGS. 8 and 9.

Figure 8:
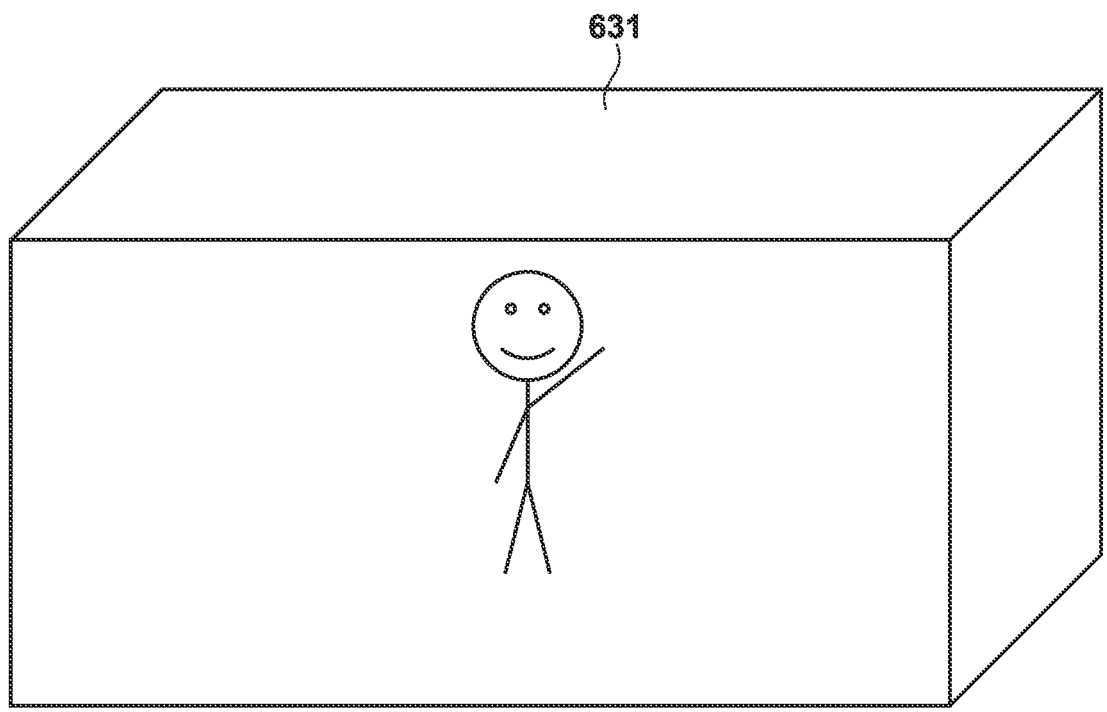
FIG. 8 shows an example of 3D spatial data according to Embodiment 1.
Figure 9:
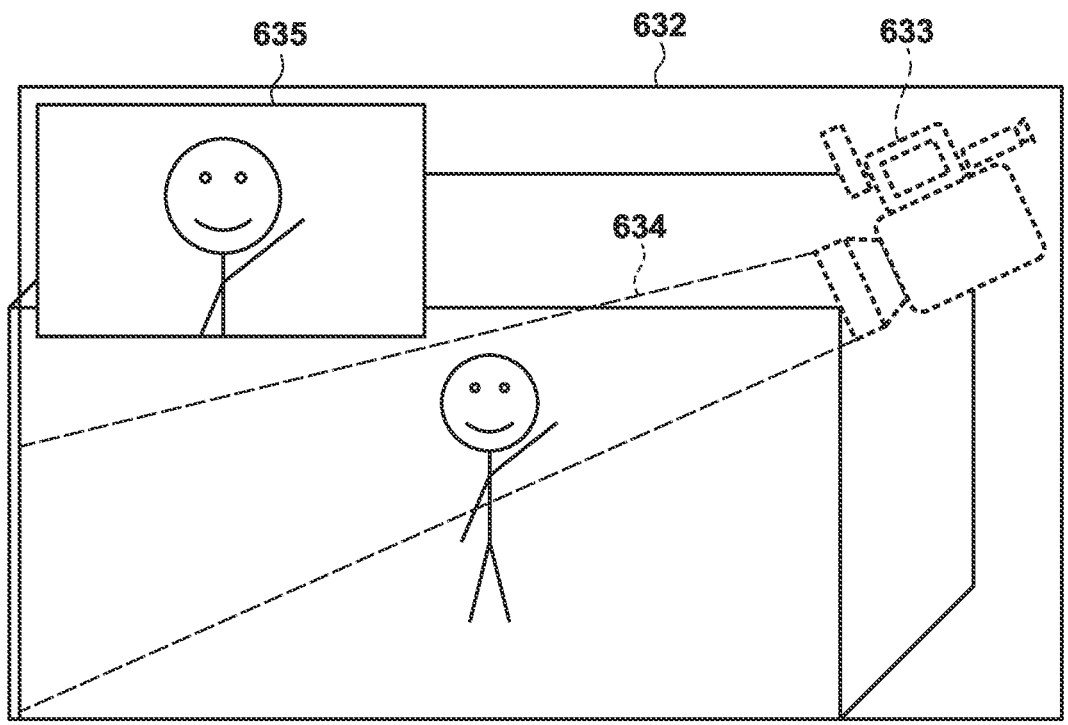
FIG. 9 illustrates a method of selecting an image from 3D spatial data according to Embodiment 1.

FIG. 8 shows an example of 3D spatial data generated by the image combining unit 202. In FIG. 8, a 3D spatial image 631 is generated by the image combining unit 202 of the image distribution apparatus 200 obtaining 3D information from image data generated by the plurality of, namely first to third image capture apparatuses 110A to 110C. The image transmitting unit 203 encodes 3D spatial data corresponding to the 3D spatial image 631 and distributes the encoded data to the display apparatus 300.

In the display apparatus 300, the image generating unit 302 decodes the 3D spatial data, and the 3D spatial image 631 is displayed in the display unit 305. The selection unit 304 can accept a user operation to dispose a virtual camera 633 at a desired position in the 3D spatial image 631 and pan, tilt, and zoom the virtual camera 633. When the selection unit 304 accepts an instruction to select an image, an image selection screen 632 is displayed in the display unit 305, as shown in FIG. 9. The image selection screen 632 displays a virtual camera 633, an image-capture assist display 634, and a display check screen 635 that are superimposed on the 3D spatial image 631. The user can set the virtual camera 633 at a desired position in the 3D spatial image 631 by operating the selection unit 304, and can perform pan, tilt, and zoom operations. The image-capture assist display 634 presents auxiliary information that changes in accordance with panning, tilting, and zooming of the virtual camera 633, and lines indicating an image-capture range of the virtual camera 633 are identifiably displayed. Although the image-capture assist display 634 in the present embodiment is presented by dashed lines, information such as the position coordinates, focal length, or the like of the virtual camera 633 in the 3D spatial image 631 may alternatively be displayed. The image generating unit 302 of the display apparatus 300 generates data of an image captured by the virtual camera 633 in accordance with information regarding the 3D spatial image 631 and the virtual camera 633, and the image captured by the virtual camera 633 is displayed in the display check screen 635. The user can adjust image-capture parameters for the virtual camera 633 while looking at the image displayed in the display check screen 635. Then, if the user finally determines the image-capture parameters for the virtual camera 633 by operating the selection unit 304, the virtual camera 633, the image-capture assist display 634, and the display check screen 635 are hidden, and the image captured by the finally determined virtual camera 633 is displayed in full screen. Further, the information transmitting/receiving unit 306 transmits information regarding the finally determined virtual camera 633 as the viewed image information to the image distribution apparatus 200 in the image capture system 100. In the image distribution apparatus 200, the system control unit 205 counts the number of views for the image capture apparatus 110 that captured an image of an image-capture range that is most selected by a plurality of display apparatuses 300, based on the image-capture parameters for the virtual camera 633 received from the plurality of display apparatuses 300, and the count value is recorded in the recording unit 206.

Note that, in the present embodiment, an example has been described in which the image capture system 100 counts the number of views of an image captured by each image capture apparatus based on the viewed image information regarding the image being displayed in the display unit 305. However, for example, information regarding actions, such as rating and payment for the image being viewed, may alternatively be transmitted to the image capture system 100, and the image capture system 100 may count the number of times each action has been executed.

In the present embodiment, the combined image data is transmitted from the image capture system 100 to the display apparatus 300, and the display apparatus 300 performs processing corresponding to a selection operation of the selection unit 304. However, the data exchanged between the apparatuses can be changed as appropriate; for example, the image capture system 100 may receive a selection operation of the selection unit 304 from the display apparatus 300, perform processing corresponding to the selection operation, and transmit the processing results to the display apparatus 300.

Next, an example of a notification method using the viewed image information performed in the image capture system 100 will be described with reference to FIGS. 10 and 11. The viewed image information transmitted from a plurality of display apparatuses 300 to the image capture system 100 is used for various applications. In the present embodiment, an example of giving notification such that a subject 500 can identify a specific image capture apparatus 110 that the subject 500 is to gaze at out of the plurality of image capture apparatuses 110A to 110H, will be described.

The viewed image information transmitted from the display apparatus 300 to the image capture system 100 is received by the information transmitting/receiving unit 204 of the image distribution apparatus 200 and output to the system control unit 205. The system control unit 205 analyzes the viewed image information received from a plurality of display apparatuses 300 and updates the analysis results recorded in the recording unit 206. Table 1 shows an example of analysis result data recorded in the recording unit 206.

TABLE 1

| Image Capture Apparatus Identification Information | Action | Number of Times of Execution |
|---|---|---|
| Image Capture Apparatus A | Number of Views | 124 |
| | High Rating | 58 |
| | Low Rating | 21 |
| | Degree of Support | 38 |
| | ... | ... |
| Image Capture Apparatus B | Number of Views | 1047 |
| | High Rating | 835 |
| | Low Rating | 61 |
| | Degree of Support | 546 |
| | ... | ... |
| ... | ... | ... |

As shown in Table 1, the viewed image information includes information selected by the user, i.e. a viewer, such as the number of times each of the images captured by the plurality of image capture apparatuses 110A to 110H has been viewed and the number of times each action has been executed. Note that the viewed image information is not limited to the number of times, and may also be information such as viewing time, the amount of money paid through each action, and the high rating. The system control unit 205 calculates the degree of attention of each of the plurality of image capture apparatuses 110A to 110H using the viewed image information. As an example of the calculation of a degree of attention A, a weight Wi of the degree of attention is set for the number of views and an action such as giving a high rating, and the degree of attention A is obtained from Equation 1 using the number of times Ni the action has been executed in the plurality of image capture apparatuses 110A to 110H.

$$A_x = \Sigma W_i \times N_i \quad \text{Equation 1}$$

$A_x$ denotes the degree of attention of an image capture apparatus X, $W_i$ denotes the weight of the degree of attention of an action i, and $N_i$ denotes the number of times the action i has been executed.

Note that, in the present embodiment, the degree of attention is calculated using an arithmetic expression, but the calculation method can be changed, as appropriate, to a method of calculation through machine learning using a learning model such as a neural network, for example.

The system control unit 205 generates notification control information for the respective image capture apparatuses 110A to 110H based on the degrees of attention A of the respective image capture apparatuses 110A to 110H. The notification control information is, for example, control information for controlling the notification unit 115 of the second image capture apparatus 110B having a degree of attention that is higher than a predetermined reference value (predetermined value) or that has the highest degree of attention (hereinafter collectively referred to simply as "that has a high degree of attention"). The notification control information is transmitted to the second image capture apparatus 110B via the information transmitting/receiving unit 204. The second image capture apparatus 110B receives, with the information input/output unit 114, the notification control information from the image distribution apparatus 200, and outputs the received information to the image-capture control unit 112. The image-capture control unit 112 generates a control signal based on the notification control information and drives the notification unit 115. When the image capture apparatus with the highest degree of attention is caused to perform notification processing, the notification control information need only be transmitted to the second image capture apparatus 110B, and need not be transmitted to the image capture apparatuses 110A and 110C to 110H. Alternatively, notification control information indicating that the notification processing need not be performed or notification control information for executing notification processing to indicate that the degree of attention is not high may be transmitted to the image capture apparatuses 110A and 110C to 110H.

Figure 10:
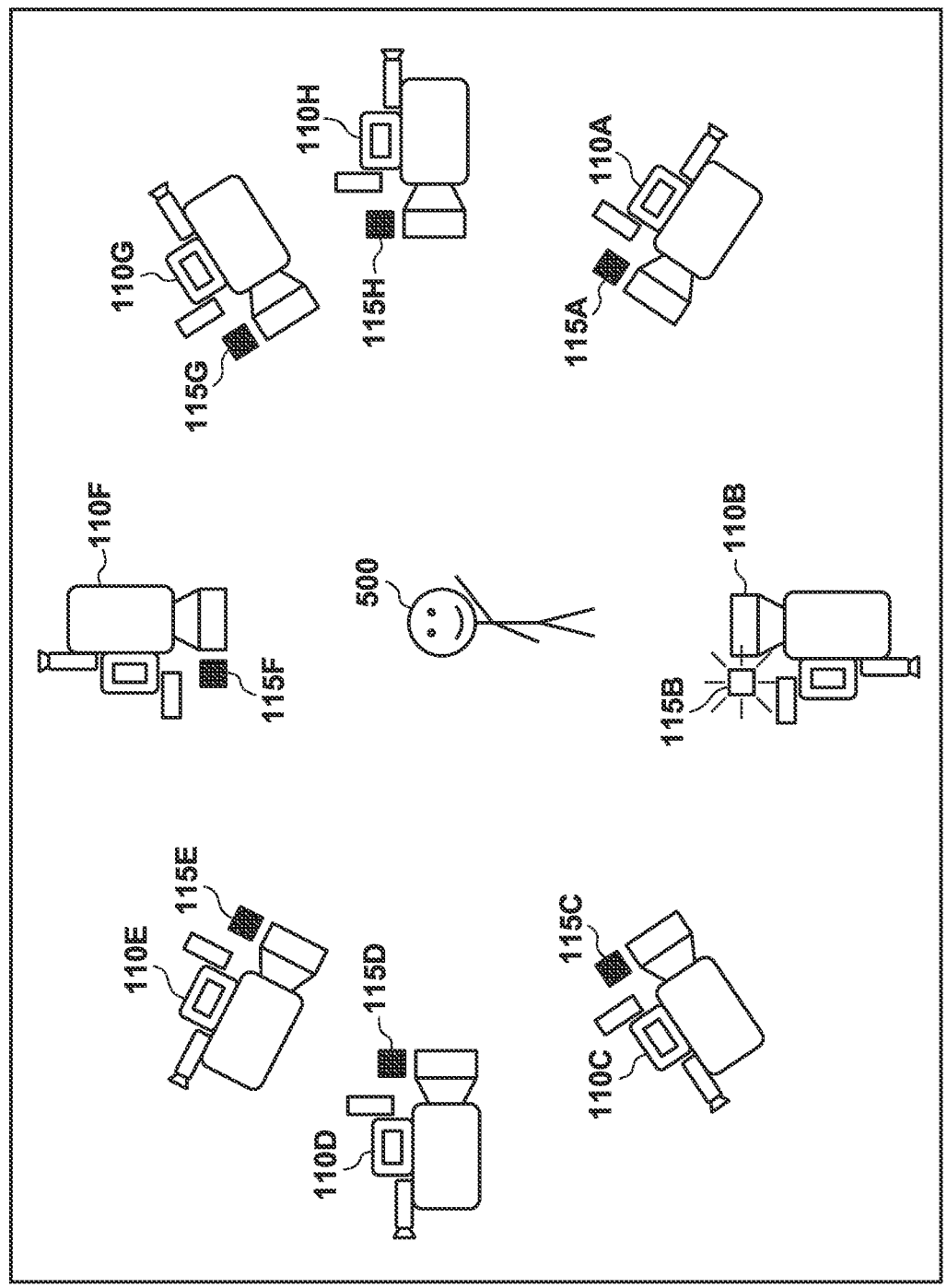
FIG. 10 illustrates a notification operation performed by a specific image capture apparatus according to Embodiment 1.

FIG. 10 shows an example of a notification mode of the notification unit 115 when the second image capture apparatus 110B has a high degree of attention. If the system control unit 205 determines that the degree of attention of the second image capture apparatus 110B is high, among the degrees of attention of the plurality of image capture apparatuses 110A to 110H, the system control unit 205 transmits the notification control information to the second image capture apparatus 110B. Upon receiving the notification control information, the second image capture apparatus 110B turn on the notification unit 115B to notify the subject 500 that the image captured by the second image capture apparatus 110B is attracting attention of viewers. The notification unit 115 need only be visually recognized by a subject, and may be a tally lamp or the like, for example. In the present embodiment, an example of driving the notification unit 115 of the second image capture apparatus 110B with a high degree of attention has been described; however, a configuration may alternatively be employed in which the notification units 115 are driven so as to vary the brightness, color, or the like of the notification units 115 of the plurality of image capture apparatuses 110A to 110H when emitting light, in accordance with the respective degrees of attention. For example, each notification unit 115 may emit light when the degree of attention is higher than a predetermined reference value, when the degree of attention is the lowest, or when the degree of attention is lower than a predetermined reference value. Alternatively, each notification unit 115 may emit light in any of those cases with a different color, lighting mode, or blinking mode depending on the case such that the subject can identify the degree of attention.

In the present embodiment, the system control unit 205 of the image distribution apparatus 200 generates the notification control information and transmits the generated information to a specific image capture apparatus; however, the plurality of image capture apparatuses 110A to 110H each may obtain the analysis results recorded in the recording unit 206 of the image distribution apparatus 200 and cause the image-capture control unit 112 to generate the notification control information.

The image capture system 100 may also associate the notification units 115 of the plurality of image capture apparatuses 110 with each other to given notification, as shown in FIG. 11. In FIG. 11, if the sixth image capture apparatus 110F is the specific image capture apparatus with a high degree of attention that the subject 500 is to gaze at, the sixth image capture apparatus 110F is located behind the subject 500 and out of sight of the subject 500. In this case, based on the degrees of attention of the respective image capture apparatuses 110A to 110H and the positional relationship between the image capture apparatuses 110A to 110H and the subject 500, the system control unit 205 generates the notification control information and transmits the generated information to the image capture apparatuses 110A to 110H so as to cause the image capture apparatuses other than the sixth image capture apparatus 110F, namely the first to fifth, seventh, and eighth image capture apparatuses 110A to 110E, 110G, and 110H to notify, in association with each other, the subject 500 that the subject 500 is to gaze at the sixth image capture apparatus 110F, as shown in FIG. 11. Then, the notification units 115 turn on such that, of the notification units 115A to 115F of the first to sixth image capture apparatuses 110A to 110F, the notification unit 115F of the sixth image capture apparatus 110F that the subject 500 is to gaze at emits the brightest light, the notification unit 115B of the third image capture apparatus 110B that is farthest from the sixth image capture apparatus 110F emits the darkest light, and the brightness of light emitted by the notification units 115A, 115C to 115E, 115G, and 115H of the first, third to fifth, seventh, and eighth image capture apparatuses 110A, 110C to 110E, 110G, 110H increase toward the sixth image capture apparatus 110F. Alternatively, a configuration may be employed in which notification units 116A to 116F that are different from the notification units 115A to 115F are provided and display symbols such as arrows to give notification so as to guide the subject 500 to the sixth image capture apparatus 110F that the subject 500 is to gaze at. The notification method of the notification units 115 can also be changed as appropriate; for example, notification may be given by changing color or displaying any image.

Note that, in addition to the configuration of the image capture system 100 in which the system control unit 205 distributes the combined image data and controls the notification units 115 based on the degrees of attention of the plurality of image capture apparatuses 110A to 110H, if an image is being distributed that is captured by an image capture apparatus that has been designated in advance by the distributor, the control method may be switched so as to drive the notification unit of the image capture apparatus that captures the image being distributed. This enables switching between control in the case of giving notification of the pre-designated image capture apparatus regardless of the number of views and control in the case of giving notification of an image capture apparatus with a high degree of attention.

Further, if the notification unit is frequently switched in response to changes in the image with a high degree of attention (number of views), there is a concern that the line of view of the subject will waver as a result of following the notification units. Therefore, control may be performed so as to change the content of notification processing performed by the notification units after a lapse of a predetermined (fixed or variable) time if the degree of attention changes, or to change the content of notification processing of the notification units if the number of views changes by a predetermined value or more.

According to Embodiment 1, notification can be given to a subject such that the subject can identify an image capture apparatus that the subject is to gaze at, based on the viewed state of images captured by a plurality of image capture apparatuses and distributed to a plurality of display apparatuses.

Embodiment 2

Next, Embodiment 2 will be described.

In Embodiment 1 above, the viewed image information collected from a plurality of display apparatuses 300 is used by the image capture system 100 to give notification such that the subject 500 can identify a specific image capture apparatus 110 that the subject 500 is to gaze at. In contrast, in Embodiment 2, the viewed image information is used to give notification indicating an image to which a viewer of the display apparatus 300 is paying attention to viewers of other display apparatuses 300.

The degrees of attention of the images captured by the plurality of image capture apparatuses 110 are expected to change over time. Thus, if a user starts viewing a distributed image in the middle of a viewing session, there is a possibility that the user will be confused as to which of the images captured by the image capture apparatuses to view. In Embodiment 2, notification indicating an image to which a viewer of a specific display apparatus 300 is paying attention is given to viewers of the other display apparatuses 300 using the viewed image information regarding the specific display apparatus 300.

Note that the configuration and functions of the system and apparatuses of Embodiment 2 are the same as those of Embodiment 1.

In Embodiment 2, the image capture system 100 embeds the viewed image information obtained from the specific display apparatus 300 and the degree of attention calculated by the system control unit 205 as metadata in the combined image data, and transmits this data to other display apparatuses 300. The image transmitting unit 203 transmits the combined image data with the metadata embedded to the other display apparatuses 300 as in Embodiment 1. Each of the other display apparatuses 300 receives, with the image receiving unit 301, the combined image data with the metadata embedded, which is then output to the image generating unit 302. The image generating unit 302 extracts the metadata from the combined image data. When each of the other display apparatuses 300 receives the combined image data from the image distribution apparatus 200 and displays the received data in the display unit 305 for the first time, the display apparatus 300 references the metadata and performs control so as to select and display an image with a high degree of attention in the particular display apparatus 300. A configuration may also be employed in which information such as an image and an image-capture range to which a viewer of a specific display apparatus 300 is paying attention may be presented in an image selection screen such as that shown in FIG. 5, 7 or 9, or notification of an image with a high degree of attention may be given in the form of a message.

According to Embodiment 2, if a user starts viewing a distributed image in the middle of a viewing session, the user can start viewing the images without wondering which of the images captured by the image capture apparatuses they should view.

According to the present embodiments, when a plurality of display apparatuses are displaying/reproducing a plurality of images of a subject captured from different directions by a plurality of image capture apparatuses, it is possible to give notification corresponding to the degree of attention based on the view status of respective images to the image capture apparatuses that are capturing the images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image distribution apparatus comprising:
a processor; and
a memory storing instructions which, when executed by the processor, configure the processor of the image distribution apparatus to:
obtain a plurality of images generated by a plurality of image capture apparatuses capturing images of a predetermined subject from different directions;
transmit the plurality of images to the plurality of display apparatuses;

receive, from the plurality of display apparatuses, viewed image information regarding an image being displayed/reproduced in the plurality of display apparatuses;

calculate a degree of attention for each of the image capture apparatuses capturing the images, based on the viewed image information; and transmit, to each of the image capture apparatuses, notification control information for causing a light-emitting element of the image capture apparatus to give notification based on the degree of attention, the light-emitting element being disposed in the same orientation as a lens unit of the image capture apparatus, wherein an image capture apparatus from the plurality of image capture apparatuses with a degree of attention that is greater than the degree of attention associated with the plurality of image capture apparatuses emits light from the light-emitting element.

2. The image distribution apparatus according to claim 1, wherein the notification control information is transmitted to at least one image capture apparatus, of the image capture apparatuses, if the at least one image capture apparatus is capturing an image having the degree of attention that is higher than a predetermined value.

3. The image distribution apparatus according to claim 1, wherein the notification control information is information for executing notification processing that makes it possible to identify the degree of attention being higher than a predetermined value, the degree of attention being highest, the degree of attention being lower than a predetermined value, or the degree of attention being lowest.

4. The image distribution apparatus according to claim 1, wherein the light-emitting element has a function of giving notification by emitting light or displaying a symbol, and
the notification control information includes information for changing a brightness when the light-emitting element emits light or changing the symbol displayed by the light-emitting element.

5. The image distribution apparatus according to claim 1, wherein the viewed image information is viewed image information regarding an image selected by a viewer and displayed/reproduced in each of the plurality of display apparatuses,
wherein the instructions which, when executed by the processor, further configure the processor of the image distribution apparatus to analyze, for each of the images generated by the image capture apparatuses, the number of views or the number of times that an action has been executed, based on a plurality of pieces of the viewed image information received from the respective display apparatuses, and
the degree of attention is calculated in accordance with a result of the analysis.

6. The image distribution apparatus according to claim 5, wherein the action is accepting, from a viewer, an instruction to give a high rating to the image being displayed/reproduced in the plurality of display apparatuses, or an instruction to pay for the image being displayed/reproduced in the plurality of display apparatuses.

7. The image distribution apparatus according to claim 1, wherein the plurality of images are combined, the viewed image information relates to an image-capture range of the combined image that is set in each of the plurality of display apparatuses, and
the degree of attention for each of the image capture apparatuses that are capturing images is calculated in the image-capture range of the combined image.

8. A display apparatus that displays an image on a screen comprising:

a processor; and
a memory storing instructions which, when executed by the processor, configure the processor of the display apparatus to:
receive, from an image distribution apparatus, a plurality of images generated by a plurality of image capture apparatuses capturing images of a predetermined subject from different directions;
accept an operation performed by a viewer and select an image out of the plurality of images;
generate display image data based on the selected image;
display/reproduce the display image data; and
transmit viewed image information regarding the selected image, to the image distribution apparatus,
wherein the viewed image information is used to calculate a degree of attention to determine which image capture apparatus from the plurality of image capture apparatuses emits light from a light-emitting element.

9. An image capture apparatus comprising:

a processor; and
a memory storing instructions which, when executed by the processor, configure the processor of the display apparatus to:
generate an image by capturing an image of a predetermined subject from a direction different from a direction from which another image capture apparatus captures an image of the predetermined subject;
transmit the generated image to an image distribution apparatus, wherein the generated image is further transferred from the image distribution apparatus to a display apparatus;
receive, from the image distribution apparatus, notification control information for causing a light-emitting element to emit light based on a degree of attention, which is calculated based on viewed image information regarding an image being displayed/reproduced in the display apparatus; and
emitting the light based on the notification control information,
wherein an image capture apparatus from the plurality of image capture apparatuses with a degree of attention that is greater than the degree of attention associated with the plurality of image capture apparatuses emits light from the light-emitting element.

10. A method of controlling an image distribution apparatus that distributes an image to a plurality of display apparatuses, the method comprising:

obtaining a plurality of images generated by a plurality of image capture apparatuses capturing images of a predetermined subject from different directions;
transmitting the plurality of images to the plurality of display apparatuses;
receiving, from the display apparatuses, viewed image information regarding an image being displayed/reproduced in the display apparatuses;
calculating a degree of attention for each of the plurality of image capture apparatuses capturing the images, based on the viewed image information; and transmitting, to each of the image capture apparatuses, notification control information for causing a light-emitting element of the image capture apparatus to give notification based on the degree of attention, the light-emitting element being disposed in the same orientation as a lens unit of the image capture apparatus, wherein an image capture apparatus from the plurality of image capture apparatuses with a degree of attention that is greater than the degree of attention associated with the plurality of image capture apparatuses emits light from the light-emitting element.

11. A method of controlling a display apparatus that displays an image on a screen, the method comprising:

receiving, from an image distribution apparatus, a plurality of images generated by a plurality of image capture apparatuses capturing images of a predetermined subject from different directions;

accepting an operation performed by a viewer and selecting an image out of the plurality of images;

generating display image data based on the selected image;

displaying/reproducing the display image data; and transmitting viewed image information regarding the selected image to the image distribution apparatus, wherein the viewed image information is used to calculate a degree of attention to determine which image capture apparatus from the plurality of image capture apparatuses emits light from a light-emitting element.

12. A method of controlling an image capture apparatus, the method comprising;

generating an image by capturing an image of a predetermined subject from a direction different from a direction from which another image capture apparatus captures an image of the predetermined subject;

transmitting the image to an image distribution apparatus, wherein the image is further transferred from the image distribution apparatus to a display apparatus;

receiving, from the image distribution apparatus, notification control information for causing a light-emitting element to emit light based on a degree of attention, which is calculated based on viewed image information regarding an image being displayed/reproduced in the display apparatus; and emitting the light based on the notification control information, wherein an image capture apparatus from the plurality of image capture apparatuses with a degree of attention that is greater than the degree of attention associated with the plurality of image capture apparatuses emits light from the light-emitting element.

13. A non-transitory computer-readable storage medium storing a program for causing a computer to execute a method of controlling an image distribution apparatus that distributes an image to a plurality of display apparatuses, the method comprising:

obtaining a plurality of images generated by a plurality of image capture apparatuses capturing images of a predetermined subject from different directions;

transmitting the plurality of images to the plurality of display apparatuses;

receiving, from the display apparatuses, viewed image information regarding an image being displayed/reproduced in the display apparatuses;

calculating a degree of attention for each of the plurality of image capture apparatuses capturing the images, based on the viewed image information; and transmitting, to each of the image capture apparatuses, notification control information for causing a light-emitting element of the image capture apparatus to give notification based on the degree of attention, the light-emitting element being disposed in the same orientation as a lens unit of the image capture apparatus, wherein an image capture apparatus from the plurality of image capture apparatuses with a degree of attention that is greater than the degree of attention associated with the plurality of image capture apparatuses emits light from the light-emitting element.

14. A non-transitory computer-readable storage medium storing a program for causing a computer to execute a method of controlling a display apparatus that displays an image on a screen, the method by comprising:

receiving, from an image distribution apparatus, a plurality of images generated by a plurality of image capture apparatuses capturing images of a predetermined subject from different directions;

accepting an operation performed by a viewer and selecting an image out of the plurality of images;

generating display image data based on the selected image;

displaying/reproducing the display image data; and transmitting viewed image information regarding the selected image to the image distribution apparatus, wherein the viewed image information is used to calculate a degree of attention to determine which image capture apparatus from the plurality of image capture apparatuses emits light from a light-emitting element.

15. A non-transitory computer-readable storage medium storing a program for causing a computer to execute a method of controlling an image capture apparatus, the method comprising;

generating an image by capturing an image of a predetermined subject from a direction different from a direction from which another image capture apparatus captures an image of the predetermined subject;

transmitting the image to an image distribution apparatus, wherein the image is further transferred from the image distribution apparatus to a display apparatus;

receiving, from the image distribution apparatus, notification control information for causing a light-emitting element to emit light based on a degree of attention, which is calculated based on viewed image information regarding an image being displayed/reproduced in the display apparatus; and emitting the light based on the notification control information, wherein an image capture apparatus from the plurality of image capture apparatuses with a degree of attention that is greater than the degree of attention associated with the plurality of image capture apparatuses emits light from the light-emitting element.

* * * * *